United States Patent
Lee et al.

(10) Patent No.: US 10,750,269 B2
(45) Date of Patent: Aug. 18, 2020

(54) WIRELESS HEADPHONES HAVING BUILT-IN FLEXIBLE BATTERY

(71) Applicant: AMOGREENTECH CO., LTD., Gimpo-si, Gyeonggi-do (KR)

(72) Inventors: Gi Wook Lee, Yongin-si (KR); Seung Yun Rho, Hwaseong-si (KR)

(73) Assignee: Amogreentech Co., Ltd., Gimpo-si, Gyeonggi-do (KR)

( * ) Notice: Subject to any disclaimer, the term of this patent is extended or adjusted under 35 U.S.C. 154(b) by 0 days.

(21) Appl. No.: 16/469,364

(22) PCT Filed: Dec. 12, 2017

(86) PCT No.: PCT/KR2017/014523
§ 371 (c)(1),
(2) Date: Jun. 13, 2019

(87) PCT Pub. No.: WO2018/110933
PCT Pub. Date: Jun. 21, 2018

(65) Prior Publication Data
US 2019/0394554 A1 Dec. 26, 2019

(30) Foreign Application Priority Data
Dec. 16, 2016 (KR) .................. 10-2016-0172372

(51) Int. Cl.
*H04R 1/10* (2006.01)
*H01M 10/058* (2010.01)
(Continued)

(52) U.S. Cl.
CPC ........ *H04R 1/1025* (2013.01); *H01M 10/058* (2013.01); *H01Q 1/273* (2013.01);
(Continued)

(58) Field of Classification Search
CPC ........ H04R 1/1066; H04R 25/00; H04R 1/10; H04R 1/105; H04R 1/1025;
(Continued)

(56) References Cited

U.S. PATENT DOCUMENTS 6,406,811 B1   6/2002  Hall et al.
10,499,135 B2 * 12/2019  Lee ..................... H04R 1/1041
(Continued)

FOREIGN PATENT DOCUMENTS

JP   2010238403 A   10/2010
JP   5753258 B2     7/2015
(Continued)

*Primary Examiner* — Davetta W Goins
*Assistant Examiner* — Kuassi A Ganmavo
(74) *Attorney, Agent, or Firm* — Rothwell, Figg, Ernst & Manbeck, P.C.

(57) ABSTRACT

Wireless headphones having a built-in flexible battery are provided. Wireless headphones having a built-in flexible battery according to an exemplary embodiment of the present invention comprise: a band part having at least one fastening portion; a pair of headset parts, each of which includes a speaker unit for receiving a wirelessly transmitted audio signal and outputting the audio signal to the outside, and is connected to the band part; and a plate-shaped flexible battery which is embedded in the band part so as to supply power to the headset parts, and has a to-be-fastened portion corresponding to the fastening portion so as to be fixed in position when coupled to the band part.

9 Claims, 8 Drawing Sheets

(51) Int. Cl.
  *H01Q 1/27*  (2006.01)
  *G02B 7/02*  (2006.01)
  *H04R 25/00*  (2006.01)

(52) U.S. Cl.
  CPC ............ *H04R 1/1008* (2013.01); *G02B 7/02* (2013.01); *H01M 2220/30* (2013.01); *H04R 1/105* (2013.01); *H04R 1/1066* (2013.01); *H04R 25/00* (2013.01); *H04R 2420/07* (2013.01)

(58) Field of Classification Search
  CPC ...... H04R 2420/07; G02B 7/02; H01Q 1/273; H01M 2/0215; H01M 10/0436; H01M 10/058; H01M 220/30; H02J 7/025
  See application file for complete search history.

(56) References Cited

U.S. PATENT DOCUMENTS

| | | | | |
|---|---|---|---|---|
| 2005/0123828 A1* | 6/2005 | Oogami | ............... | H01M 2/206 429/152 |
| 2005/0260953 A1* | 11/2005 | Lefler | ............... | H04B 1/385 455/100 |
| 2007/0261153 A1* | 11/2007 | Wise | ............... | A42B 3/044 2/423 |
| 2011/0062796 A1 | 3/2011 | Farahani | | |
| 2012/0135299 A1* | 5/2012 | Kwon | ............... | H01M 2/0202 429/164 |
| 2014/0270232 A1* | 9/2014 | Vroom | ............... | H04R 5/0335 381/74 |
| 2014/0304891 A1* | 10/2014 | Waters | ............... | A42B 1/24 2/209.13 |
| 2015/0207148 A1* | 7/2015 | Kimura | ............... | H01G 11/26 429/199 |
| 2015/0211718 A1* | 7/2015 | Diekmann | ............ | H05K 1/118 362/382 |
| 2015/0279577 A1* | 10/2015 | Uchida | ............ | H01M 10/0569 429/336 |
| 2015/0349406 A1* | 12/2015 | Jung | ............... | H05K 7/2039 343/702 |

FOREIGN PATENT DOCUMENTS

| | | |
|---|---|---|
| KR | 101393675 B1 | 5/2014 |
| KR | 101685413 B1 | 12/2016 |

\* cited by examiner

WIRELESS HEADPHONES HAVING BUILT-IN FLEXIBLE BATTERY

CROSS REFERENCE TO RELATED APPLICATION

This application is a 35 U.S.C. 371 National Phase Entry Application from PCT/KR2017/014523, filed Dec. 12, 2017, which claims the benefit of Korean Patent Application No. 10-2016-0172372 filed on Dec. 16, 2016, the disclosures of which are incorporated herein in their entireties by reference.

TECHNICAL FIELD

The present invention relates to a wireless headphone, and more specifically, to a wireless headphone having a built-in flexible battery which may fix a position of the flexible battery.

BACKGROUND ART

Electronic goods, particularly, electronic goods capable of outputting sounds are becoming miniaturized with the development of technology. Such electronic goods are connected to various sound-outputting devices. In particular, functions of sound-outputting electronic goods such as MP3 players and the like are being combined in smartphones as functions of smartphones are developed. Accordingly, since reliability and convenience of wireless communication have been magnified, recently, it has become possible to connect electronic goods to sound-outputting devices using wireless communication technologies of various forms.

Headsets configured to fully cover the ears and improve sound isolation have recently come into the spotlight again due to application of a wireless communication technology such as Bluetooth.

A Bluetooth device requires a circuit part and a power part to drive a Bluetooth chip and generally receives driving power using a battery. In this case, the battery can be a general dry battery, but recently, chargeable batteries have been widely used to improve user convenience.

Such a battery is generally embedded in a housing configuring a headset. Accordingly, a space configured to accommodate the battery is necessary in the housing. In particular, the size of the housing configuring the headset should be increased so that a large-sized battery can be embedded therein to implement a high capacity battery. Further, since the weight of the battery increases when the capacity of the battery increases, the total weight of the headset increases to the extent that the weight of the battery increases. Accordingly, a user has inconvenience in use due to the weight increase.

Particularly, in the case of a headset, since a larger speaker unit than that used in conventional earphones is driven, greater power consumption is required. Accordingly, there is a limitation that a use time is short when a limited-sized battery is mounted in the housing.

DISCLOSURE

Technical Problem

The present invention is directed to providing a wireless headphone having a built-in flexible battery capable of implementing lightening and significantly increasing a use time of a communication module such as a Bluetooth module by embedding a flexible battery in a band part.

Further, the present invention is directed to providing a wireless headphone having a built-in flexible battery capable of accurately maintain bending directivity of a flexible battery while being bent.

In addition, the present invention is directed to providing a wireless headphone having a built-in flexible battery capable of decreasing the size and thickness of each of headset parts and implementing various designs because a separate space configured to embed a battery in each of the headset parts is not necessary in a case in which a flexible battery is used as a main battery.

Technical Solution

One aspect of the present invention provides a wireless headphone having a built-in flexible battery, including: a band part having at least one fastening portion; a pair of headset parts each including a speaker unit configured to receive a wirelessly transmitted audio signal and output the audio signal to the outside, the pair of headset parts being connected to the band part; and a plate-shaped flexible battery embedded in the band part to supply power to the headset parts, and having a portion to be fastened corresponding to the fastening portion to be fixed in position when coupled to the band part.

Further, the band part may include a belt-shaped frame of which one side is open; and a cover member configured to surround the frame, and the fastening portion may be formed in the frame.

In addition, the flexible battery may include at least one blade portion configured to extend to the outside from a side edge or at least one of front and rear edges, and the portion to be fastened may be formed in the blade portion.

As an example, the fastening portion may be formed as a first through hole passing through the frame, the portion to be fastened may be formed as a second through hole passing through the blade portion at a position corresponding to that of the first through hole, and the frame and the flexible battery may be fixed to each other through a fixing member simultaneously passing through the first through hole and the second through hole. The fixing member may be any one of a pin member, a bolt member, and a clip member.

As another example, the fastening portion may be formed as an incised piece which is a portion of the frame is incised, the portion to be fastened may be formed as a through hole passing through the blade portion, and the incised piece may be inserted into the through hole.

Further, the flexible battery may be disposed on at least one surface of an upper surface and a lower surface of the frame.

In addition, a circuit part including a communication part configured to transmit and receive the audio signal through wireless communication with an external device may be embedded in any one of the pair of headset parts.

In addition, any one of the band part and the headset parts may include a wireless power receiving antenna configured to receive a wireless power signal to wirelessly charge power of the flexible battery, and a shielding sheet configured to shield a magnetic field may be disposed at one side of the wireless power receiving antenna.

In addition, the flexible battery may include an electrode assembly including a positive electrode, a negative electrode, and a separator, and an exterior material in which the electrode assembly is encapsulated together with an electrolyte, and the exterior material and the electrode assembly may each provided with a pattern for contraction and relaxation when bending. The patterns formed in the exterior material and the electrode assembly may be formed to coincide with each other.

Advantageous Effects

According to the present invention, since power is supplied through a flexible battery embedded in a band part, the total weight can be reduced and a high capacity battery can be implemented, and thus a use time can be significantly increased.

Further, in the present invention, in a case in which the flexible battery is used as a main battery, since a separate space configured to accommodate the battery in headset parts can be omitted, various designs can be implemented by reducing the size and thickness of each of the headset parts.

In addition, in the present invention, the flexible battery can always maintain an initial position and perform behavior the same as that of the frame at the fixed position even when the frame is repeatedly bent during use. Accordingly, the flexible battery can flexibly cope with a deformation of the frame and bending directivity of the flexible battery can be uniformly maintained.

Further, in the present invention, since the flexible battery can be wirelessly charged using a wireless power receiving antenna, user convenience can be improved and a separate external terminal configured to charge the battery does not have to be provided. Accordingly, a wireless headset having a built-in flexible battery according to the present invention can prevent various problems such as introduction of foreign substances through an external terminal or flooding by sweat or the like.

MODES OF THE INVENTION

Figure 1:
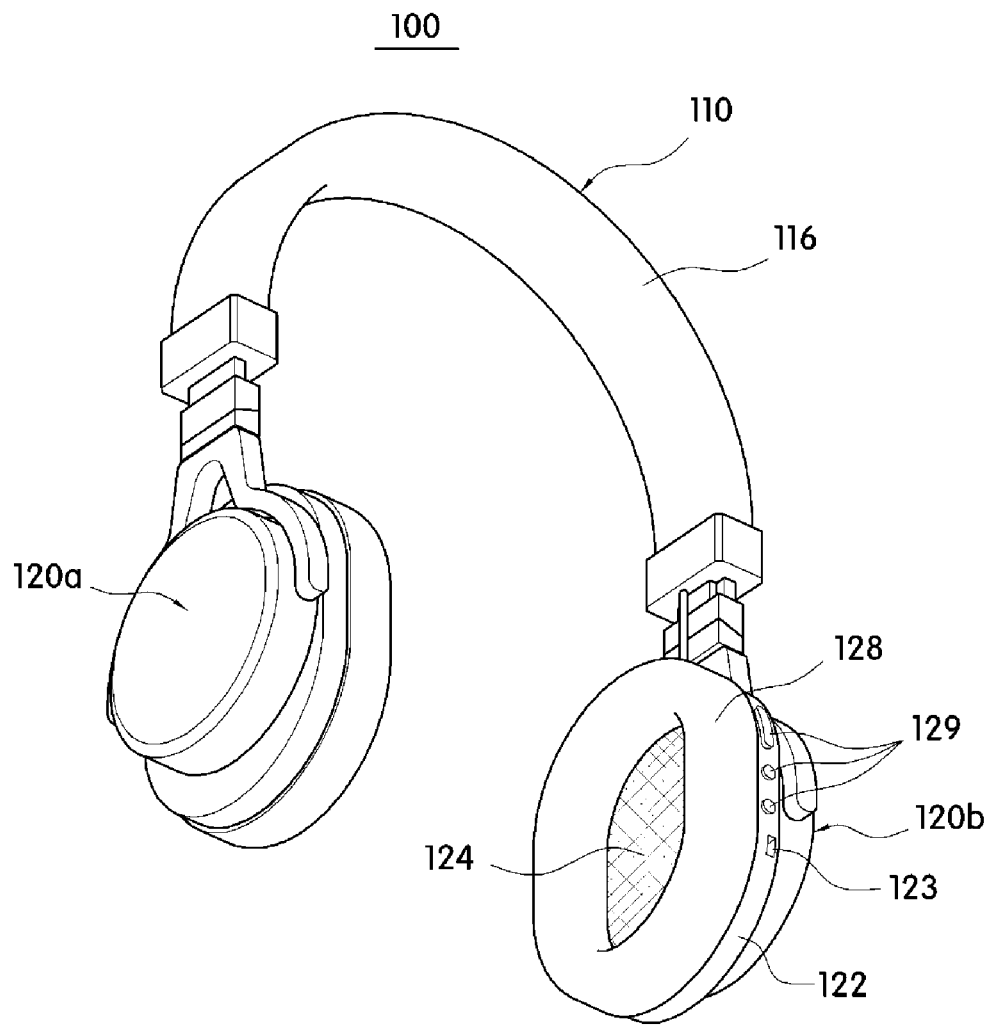
FIG. 1 is a view illustrating a wireless headphone having a built-in flexible battery according to one embodiment of the present invention.

Hereinafter, exemplary embodiments of the present invention will be described in detail with reference to the accompanying drawings which may allow one of ordinary skill in the art to easily perform the present invention. The present invention may be implemented in various forms and is not limited to the following embodiments. Components not related to the description are not included in the drawings to clearly describe the present invention, and the same reference symbols are used for the same or similar components in the description.

Figure 2:
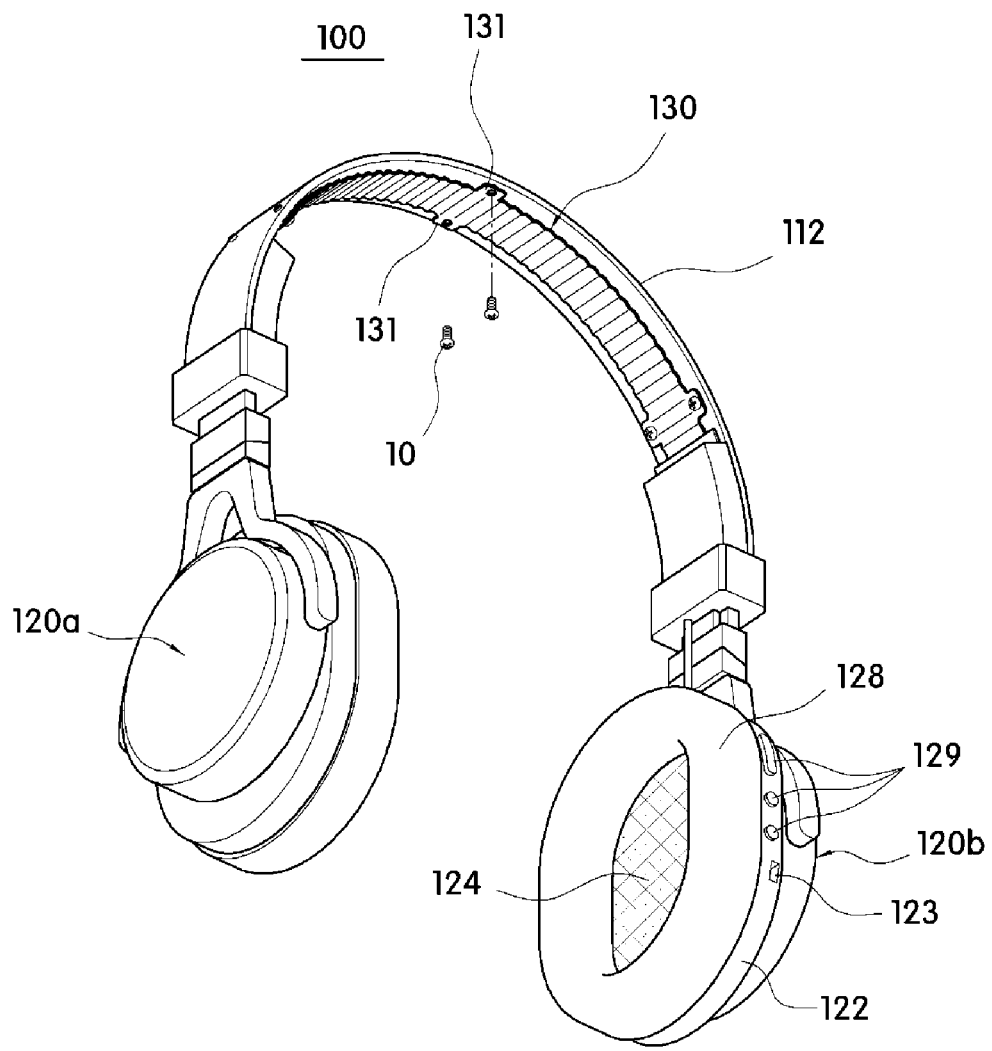
FIG. 2 is a view illustrating a state in which a cover member is removed in FIG. 1.
Figure 9:
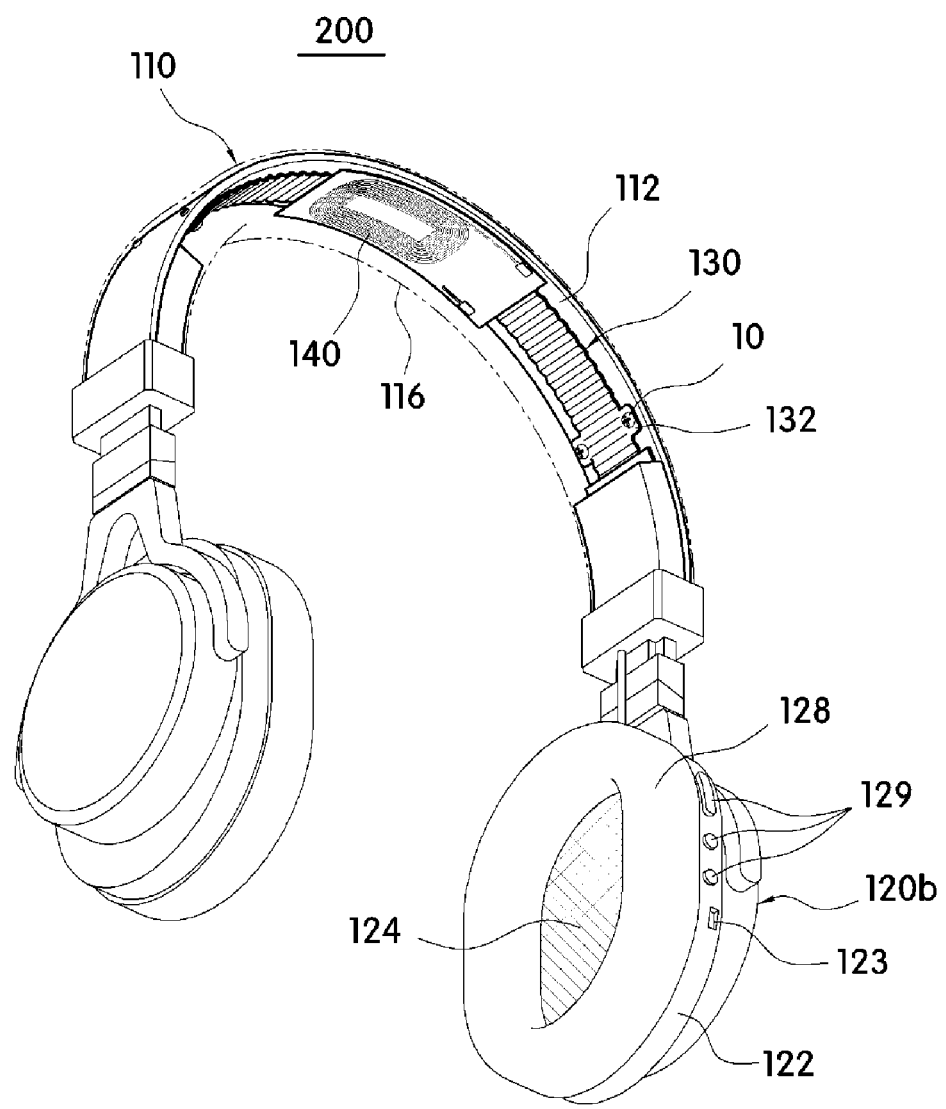
FIG. 9 is an exemplary view illustrating a case in which a wireless power receiving antenna is included in a band part in the wireless headphone having a built-in flexible battery according to the present invention.

Wireless headphones 100 and 200 having a built-in flexible battery according to one embodiment of the present invention include band part 110, headset parts 120a and 120, and band flexible batteries 130 and 230 as shown in FIGS. 1, 2, and 9.

The band part 110 may maintain a wearing state of the wireless headphones 100 and 200 so that the pair of headset parts 120a and 120b may be located at the user's ears when the wireless headphones 100 and 200 are worn.

To this end, the band part 110 may include a belt-shaped frame 112 of which one side is open, and the pair of headset parts 120a and 120b may be connected to both end portions of the frame 112, respectively. In this case, the frame 112 may be formed of a material having elasticity. Accordingly, a separation distance between both end portions of the frame 112 may increase when an external force is applied, and the separation distance may return to an original state when the external force is removed.

Accordingly, when the user wears the wireless headphones 100 and 200 according to one embodiment of the present invention, the band part 110 may surround a head of the user, and the pair of headset parts 120a and 120b connected to both end portions of the band part 110 may come into close contact with the ears by an elastic force in a state of being located at the user's ears.

In the present invention, the band part 110 may include a cover member 116 configured to surround the frame 112 to improve wearing sensation of the user when worn. As an example, the cover member 116 may be formed of a soft material such as leather, cotton, silicon, or the like.

Further, the frame 112 may be provided in a shape in which each length of both end portions to which the pair of headset parts 120a and 120b are connected are adjusted, to adjust an entire length according to a body of the user when worn.

In this case, a battery may be embedded in the band part 110 so that power may be supplied to the headset parts 120a and 120b, and the battery may be provided as plate-shaped flexible batteries 130 and 230 to cope with elastic deformation of the frame 112.

That is, in each of the wireless headphones having a built-in flexible battery 100 and 200 according to one embodiment of the present invention, since at least one flexible battery 130 or 230 is embedded in the band part 110 to supply driving power to the headset parts 120a and 120b, an own weight of the battery may be reduced and an entire use time may be increased.

In the present invention, the flexible batteries 130 and 230 may serve as main batteries configured to supply the power to the headset parts 120a and 120b, and in a case in which a prismatic battery is embedded in headset parts like a known wireless headphone, the flexible batteries 130 and 230 may serve as auxiliary batteries configured to assist the prismatic battery.

As an example, in a case in which the flexible batteries 130 and 230 serve as the main batteries configured to supply the driving power to the headset parts 120a and 120b, conventional prismatic batteries (not shown) embedded in the headset parts 120a and 120b to provide the driving power may be omitted.

Accordingly, since the headset parts 120a and 120b do not require spaces configured to accommodate the prismatic batteries, the entire size and thickness of each of the headset parts may be reduced by the size of the prismatic battery. Accordingly, in each of the headset parts 120a and 120b applied to the present invention, an available space or a variable space as much as the size corresponding to the prismatic battery may be secured. Accordingly, the headset parts 120a and 120b may be implemented in various designs, and since a weight of the headset parts 120a and 120b may be reduced by the weight of the prismatic battery, weight reduction may be achieved.

Meanwhile, in a case in which known prismatic battery is embedded in the headset parts 120a and 120b, the flexible batteries 130 and 230 embedded in the band part 110 may be used as auxiliary batteries configured to assist the capacity of the prismatic battery. Accordingly, in the wireless headphones 100 and 200 according to one embodiment of the present invention, since the entire battery capacity may be increased by the capacity of the flexible batteries 130 and 230 in comparison with a conventional wireless headphone in which a battery is embedded only in headset parts, a use time of each of the wireless headphones 100 and 200 may be significantly increased.

In the present invention, the flexible batteries 130 and 230 may be disposed on one surface or both surfaces of the frame 112, and electrically connected to at least one circuit part 126 embedded in the headset parts and/or the band part 110.

In this case, the circuit part 126 may be provided in a shape in which a wire-charging circuit and/or a wireless charging circuit is mounted on a circuit board, and may include a power converting part (not shown) configured to lower an output voltage provided from the flexible batteries 130 and 230 to an appropriate voltage and then transmit the lowered voltage. Further, the circuit part 126 may include a charging circuit configured to recharge the flexible batteries 130 and 230 by transferring power supplied from the outside to the flexible batteries 130 and 230. In this case, when the flexible batteries 130 and 230 are recharged using the power supplied from the outside, the circuit part 126 may include various circuits configured to increase charging efficiency, and may further include a protection circuit to prevent overcharge when the flexible batteries 130 and 230 are charged.

Further, the circuit part 126 may be electrically connected to a charging port 123 in a case in which the charging port 123 is provided at one side of the headset part 120b. Accordingly, the flexible batteries 130 and 230 may be recharged in a wired manner using the power supplied from the outside through the charging port 123. In the present invention, the charging port 123 may be formed in a USB port type, and the charging port 123 may simultaneously serve as a charging terminal configured to charge power of the flexible batteries 130 and 230 and a data terminal through which data is input and output.

The above-described flexible batteries 130 and 230 may each be provided to have a length substantially the same as the entire length of the band part 110, or may have a shape in which a plurality of flexible batteries 130 and 230 each having a length smaller than the entire length of the band part 110 are electrically connected to each other.

Figure 4A:
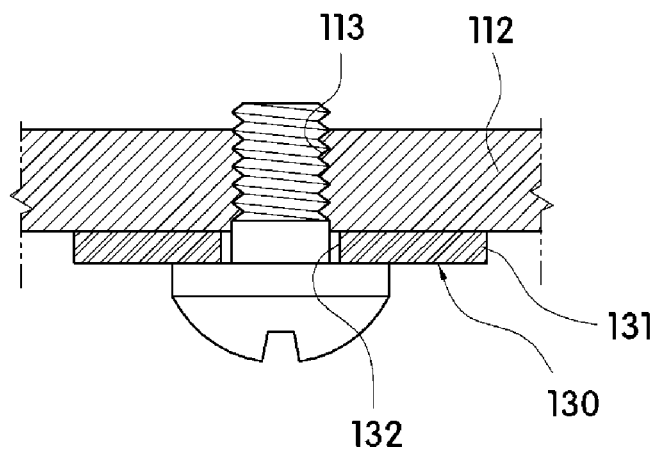
FIGS. 4A to 4C are views illustrating various engagement relations between a blade portion of the flexible battery and a frame in the wireless headphone having a built-in flexible battery according to one embodiment of the present invention.
Figure 4B:
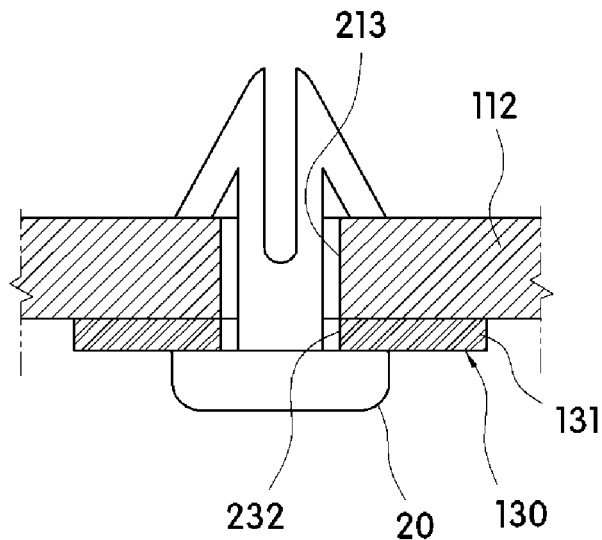
Figure 4C:
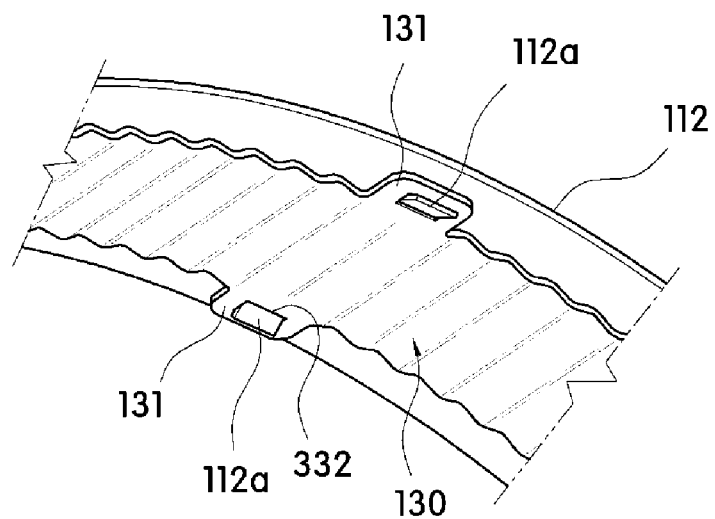
Figure 5:
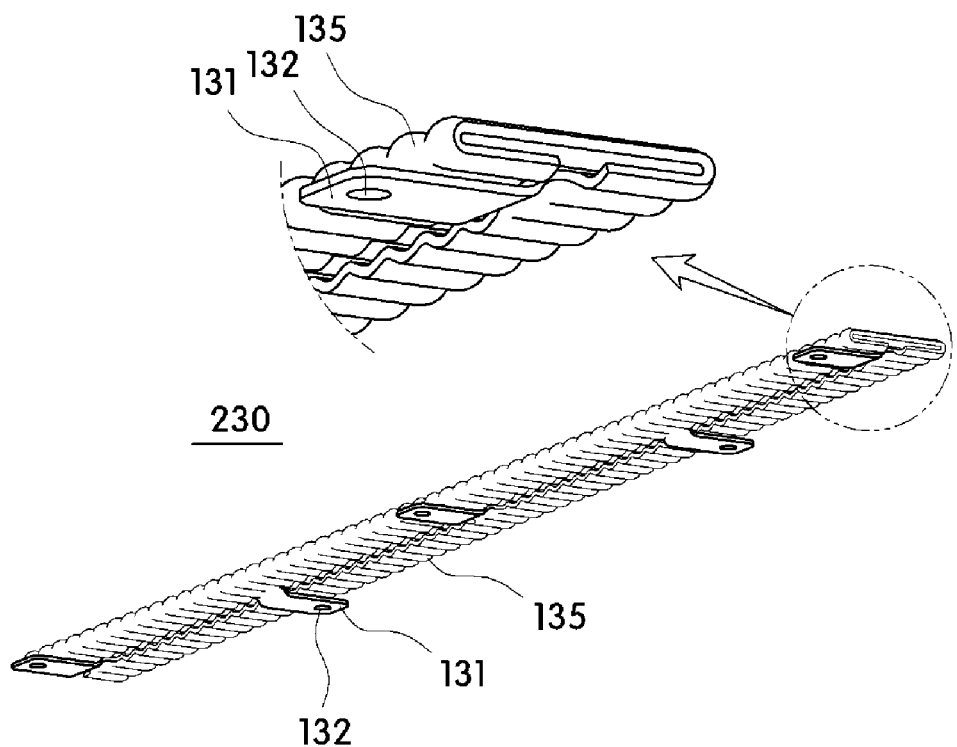
FIG. 5 is a view illustrating another flexible battery applicable to the wireless headphone having a built-in flexible battery according to one embodiment of the present invention.

In this case, as shown in FIGS. 4A to 5, in the wireless headphones 100 and 200 having a built-in flexible battery according to the present invention, fastening portions 112a, 132, and 232 and portions to be fastened 132, 232, and 332 configured to fix positions of the flexible batteries 130 and 230 disposed on one surface or both surfaces of the frame 112 may be provided at the frame 112 and the flexible batteries 130 and 230 to correspond to each other.

Accordingly, the flexible batteries 130 and 230 may always maintain initial positions fixed to the frame 112 even when the frame 112 is repeatedly bent while being used. Further, the flexible batteries 130 and 230 may have the same behavior as the frame 112 at the positions fixed to the frame 112. Accordingly, the flexible batteries 130 and 230 may flexibly cope with deformation of the frame 112 and bending directivity of the flexible batteries 130 and 230 may be uniformly maintained.

Particularly, in a case in which each of the flexible batteries 130 and 230 includes a pattern 135 for contraction and relaxation which will be described later, the flexible batteries 130 and 230 may be contracted and relaxed in an intended direction when the frame 112 is bent, and thus may be stably protected by the patterns 135.

To this end, the fastening portions 112a, 132, and 232 may be formed in the frame 112, and the portions to be fastened 132, 232, and 332 may be formed in the flexible batteries 130 and 230. In this case, the portions to be fastened 132, 232, and 332 may be formed at positions in which the capacity of the flexible batteries 130 and 230 is ensured and an electrode assembly 134 embedded in exterior materials 133a and 133b is not damaged while secure.

Figure 3:
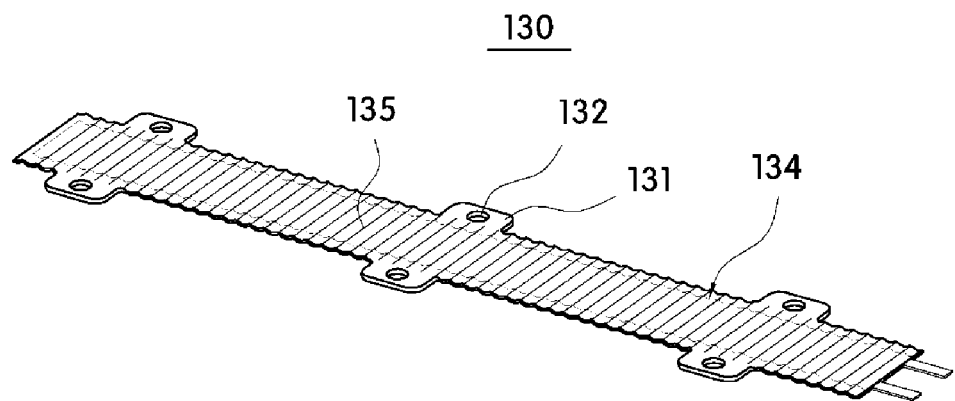
FIG. 3 is a view illustrating a flexible battery applicable to the wireless headphone having a built-in flexible battery according to one embodiment of the present invention.

As an example, each of the flexible batteries 130 and 230 may include at least one blade portion 131 configured to extend to the outside on a side edge in which the exterior materials 133a and 133b face each other or at least any one side of front and rear edges, and as shown in FIGS. 2 and 3, the portions to be fastened 132, 232, and 332 may be formed in the blade portion 131.

In the present invention, a pair of blade portions 131 may be provided at the edges of the flexible batteries 130 and 230, and a plurality of blade portions 131 may be formed to be spaced apart from each other at an interval.

As an example, the portions to be fastened may be formed as second through holes 132 and 232 passing through the blade portion 131, and the fastening portions may be formed as first through holes 113 and 213 passing through the frame 112 at positions corresponding to the second through holes 132 and 232. In this case, as shown in FIGS. 4A and 4B, the frame 112 and the flexible batteries 130 and 230 may be fixed to each other by fixing members 10 and 20 simultaneously passing through the first through holes 113 and 213 and the second through holes 132 and 232.

In the present invention, the fixing member may be any one of a pin member, a bolt member 10, and a clip member 20, and the clip member 20 may have a shape fixed after passing through the first through hole 213 and the second through hole 232 through elastic deformation.

However, the fixing member is not limited thereto, and all known various manners may be applied in a shape in which the frame 112 and the flexible batteries 130 and 230 may be simultaneously fastened.

As another example, as shown in FIG. 4C, the fastening portion may be formed as an incised piece 112a which a portion of the frame 112 is incised, and the portion to be fastened may be formed as a through hole 332 passing through the blade portion 131. Accordingly, in a case in which the flexible batteries 130 and 230 are disposed to be in contact with the frame 112, the incised piece 112a may be inserted into the through hole 332. Accordingly, the flexible batteries 130 and 230 may be fixed to one surface of the frame 112.

As still another example, as shown in FIG. 5, in a case in which each of the edges of the enclosed exterior materials 133a and 133b is implemented to be folded on at least one surface of an upper surface and a lower surface of the flexible battery 230, the blade portions 131 may extend from both side ends of the flexible battery 230. Further, in a case in which the blade portions 131 are formed on both side ends of the flexible battery 230, the blade portions 131 may be alternatively disposed. In this case, at least one of the above-described methods of FIGS. 4A to 4C may be appropriately applied to the fixing method between the through hole 132 formed in the blade portion 131 and the frame 112.

The headset parts 120a and 120b may output audio signals wirelessly transmitted from an external device so that the user may hear the audio signals.

The headset parts 120a and 120b may be provided in a pair to be located on both ears of the user when the wireless headphones 100 and 200 are worn. Further, each of the headset parts 120a and 120b may include a cover member 128 configured to cover an outer surface of the housing 122 to improve the wearing sensation. As an example, the cover member 128 may be formed of a soft material such as leather, cotton, or the like.

In this case, each of the headset parts 120a and 120b may include a speaker unit 124 inside the housing 122 to output the audio signals transmitted from the external device to the outside to reproduce the audio signals. Further, each of the headset parts 120a and 120b may include a circuit part 126 including a communication part 126a configured to receive the audio signals through wireless transmission and reception with the external device.

In the present invention, the external device may be a portable electronic device such as a mobile phone, a PMP, a tablet, or the like, and may also be a sound device such as an audio. Further, a communication method through the communication part 126a may be a Bluetooth communication method, a Zigbee communication method, or an NFC communication method.

Further, although not shown, a microphone (not shown) capable of receiving a sound of the user may be provided at one side among the headset parts 120a and 120b. Accordingly, sound signals of the user input through the microphone may be transmitted to the external device.

The circuit part 126 may receive audio signals wirelessly transmitted from the external device, and may output the received audio signals through the speaker unit 124. To this end, the circuit part 126 may have various built-in circuits, and an overall operation may be controlled through control of the circuit part 126.

Figure 6:
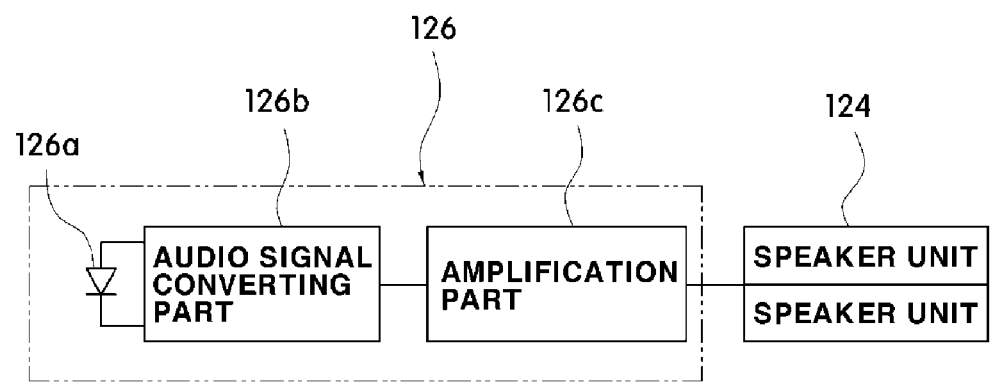
FIG. 6 is a view schematically illustrating a detailed configuration of a circuit part embedded in a headset part in the wireless headphone having a built-in flexible battery according to one embodiment of the present invention.

As an example, as shown in FIG. 6, the circuit part 126 may include a communication part 126a configured to receive audio signals wirelessly transmitted from the external device, a converting part 126b configured to convert the audio signals received through communication part 126a to electric signals, an amplification part 126c configured to amplify the audio signals converted to the electric signals in the converting part 126b and transmit the audio signals to the speaker unit 124.

In the present invention, the speaker unit 124 configured to reproduce and output the audio signals may be provided in both of the pair of headset parts 120a and 120b, and the circuit part 126 may be provided in both of the pair of headset parts 120a and 120b and in only one headset part 120b.

Meanwhile, a plurality of function buttons 129 configured to perform various functions such as a power switch which turns on/off the power, a volume adjustment, a music selection, or the like may be provided on at least one of the pair of headset parts 120a and 120b. In this case, a method of selecting music may be implemented in a manner of moving to next music or previous music or moving between one or more music, by performing a single click, a double click, or a triple click on the buttons.

In the present invention, the function button 129 may be implemented as a general micro switch type, or a clickable wheel button may be used as needed to increase or decrease the volume by rolling wheels. Further the function buttons 129 may perform various functions according to click operations. Operations of the function buttons 129 may be controlled through the circuit part 126.

Further, as described above, at least one of the pair of headset parts 120a and 120b may be provided with the charging port 123 electrically connected to the circuit part 126.

Figure 8:
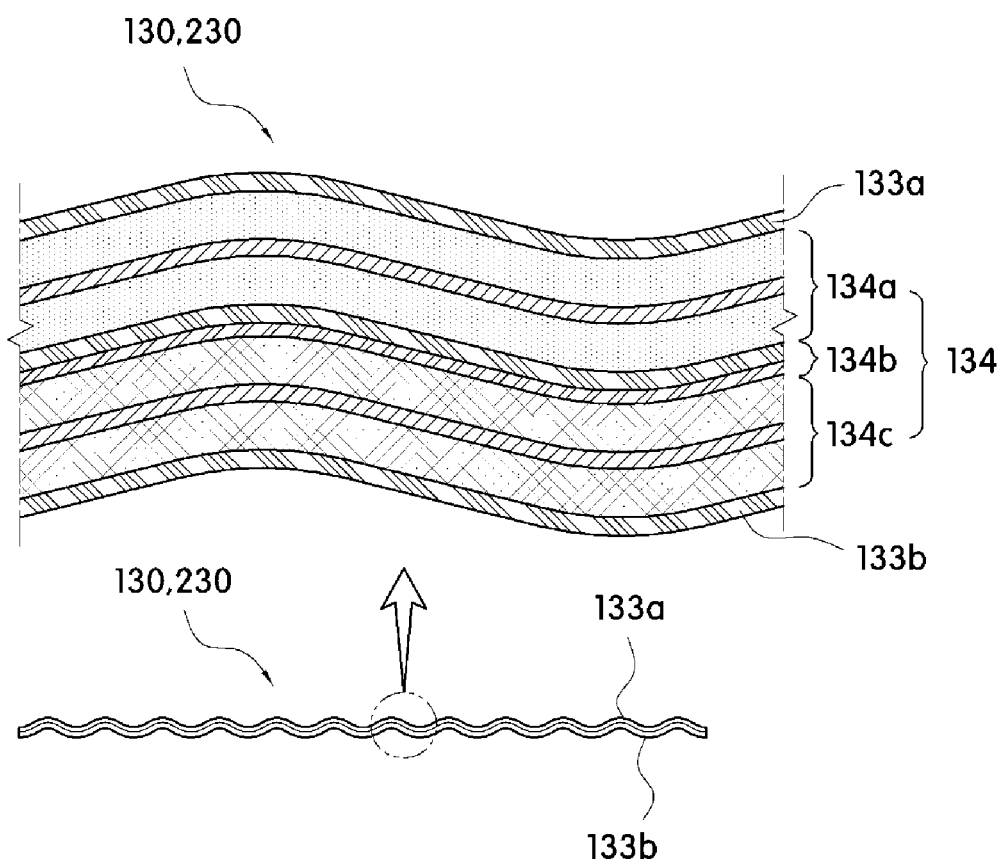
FIG. 8 is an enlarged view illustrating a detailed configuration of the flexible battery applicable to the present invention.

The flexible batteries 130 and 230 may supply stored power to the headset parts 120a and 120b to increase a driving time of the circuit part 126. As shown in FIG. 8, each of the flexible batteries 130 and 230 includes the exterior materials 133a and 133b and the electrode assembly 134.

The exterior materials 133a and 133b may be formed of a plate-shaped member having a predetermined area. The above-described exterior materials 133a and 133b may accommodate the electrode assembly 134 and an electrolyte to protect the electrode assembly 134 from the external force.

To this end, the exterior materials 133a and 133b may include a first exterior material 133a and a second exterior material 133b, and an edge of each of the first exterior material 133a and the second exterior material 133b may be sealed through an adhesive agent. Accordingly, exposure of the electrolyte and electrode assembly 134 accommodated in the exterior materials 133a and 133b to the outside may be prevented, and the electrolyte may be prevented from leaking to the outside.

As shown in FIG. 3, the electrode assembly 134 is sealed with the electrolyte in the exterior materials 133a and 133b, and may include a positive electrode 134a, a negative electrode 134c, and a separator 134b. In this case, the positive electrode 134a and the negative electrode 134c may be in a separated shape through the separator 134b disposed between the positive electrode 134a and the negative electrode 134c.

Since the exterior materials 133a and 133b and the electrode assembly 134 have the same structure as that of the known structure, detailed descriptions will not be provided.

In this case, the flexible battery 230 according to one embodiment of the present invention may increase the entire capacity thereof by maximizing an area of the electrode assembly 134 while maintaining the same size. That is, as shown in FIG. 5, the flexible battery 230 may be configured in a shape in which the exterior materials 133a and 133b disposed at outer sides from edges of the electrode assembly 134 are partially folded toward at least one surface of the upper surface and the lower surface of the flexible battery 230. Accordingly, the flexible battery 230 may increase the entire area of the electrode assembly 134 while identically maintaining the entire size thereof (as an example, a size of width). In this case, the portion to be fastened 132 may be provided at folded end portions of the exterior materials 133a and 133b.

Meanwhile, each of the flexible batteries 130 and 230 according to one embodiment of the present invention may be provided in a flexible plate shape, but may include the pattern 135 for contraction and relaxation while being bent on at least one surface.

The pattern 135 may be formed so that mountain portions and valley portions may be repeatedly arranged along a longitudinal direction or a width direction of each of the flexible batteries 130 and 230.

Figure 7:
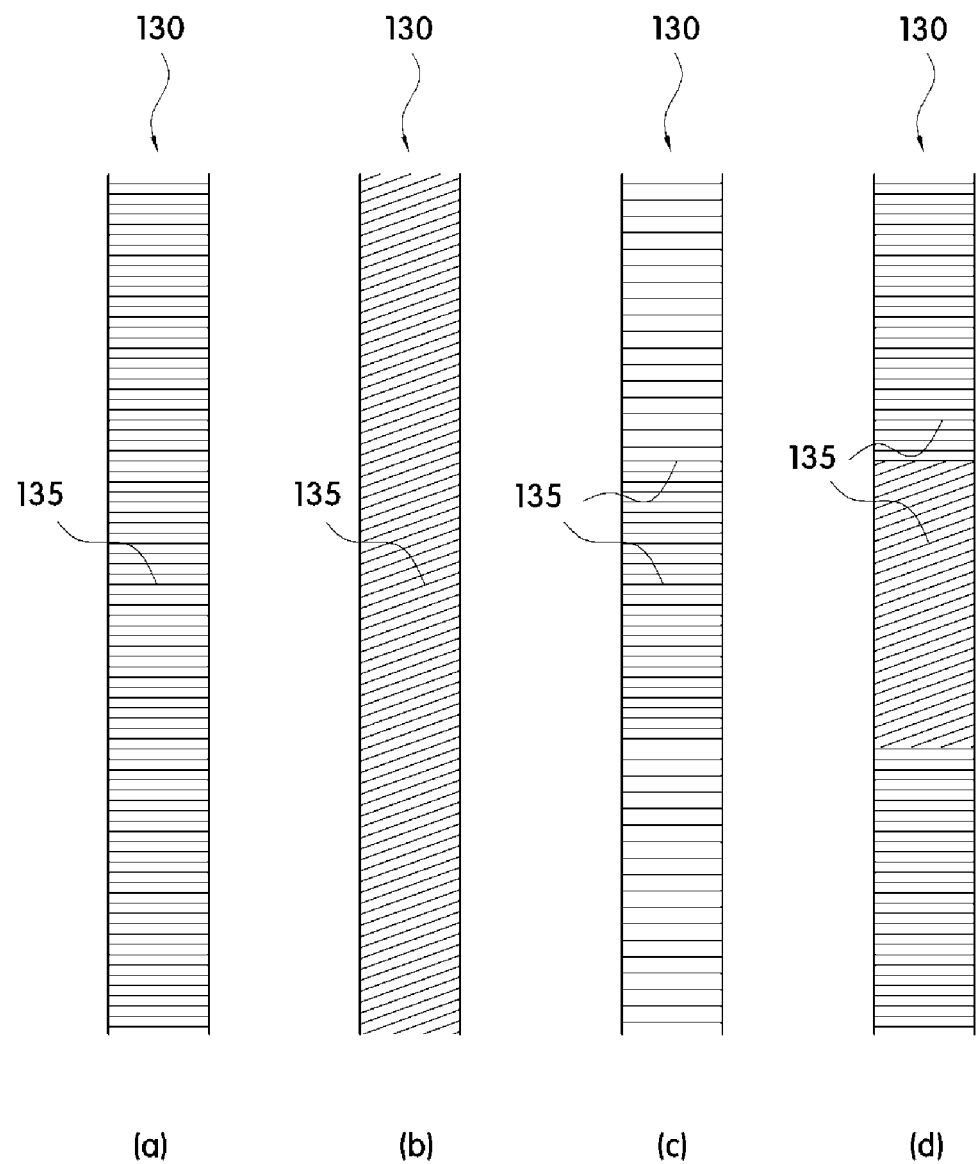
FIG. 7 is a schematic view illustrating various shapes of patterns formed in an exterior material and an electrode assembly in the flexible battery applicable to the present invention.

In a specific description, the mountain portions and the valley portions of the pattern 135 may be formed to be parallel to a straight line parallel to the width direction of each of the flexible batteries 130 and 230 (see FIGS. 7A and 7C) or to be inclined by a predetermined angle from the straight line parallel to the width direction of each of the flexible batteries 130 and 230 (see FIG. 7B). Further, the mountain portions and the valley portions of the pattern 135 may have a shape in which the pattern formed to be parallel to the straight line parallel to the width direction of each of the flexible batteries 130 and 230 and the pattern formed to be inclined by the predetermined angle from the straight line parallel to the width direction of each of the flexible batteries 130 and 230 are combined (see FIG. 7D). Further, in the mountain portions and the valley portions of the pattern 135, the mountain portions and the valley portions which are adjacent to each other may be provided to have the same interval (see FIGS. 7A and 7B), or the mountain portions and the valley portions which are adjacent to each other may be provided to have different intervals, or the same interval and the different intervals may be combined (see FIG. 7C).

Accordingly, the flexible batteries 130 and 230 applied to the present invention may flexibly cope with contraction and relaxation in the longitudinal direction which occur when the frame 112 is elastically deformed. Accordingly, overall fatigue may be reduced by offsetting or minimizing a deformation amount of each of the flexible batteries 130 and 230 even when the flexible batteries 130 and 230 are repeatedly bent together with the frame 112. Further, the electrode assembly 134 may be protected by preventing deformation of the electrode assembly 134 disposed inside the exterior materials 133a and 133b or minimizing a deformation amount of the electrode assembly 134.

Accordingly, in the wireless headphones 100 and 200 according to the present invention, since each of the flexible batteries 130 and 230 may be protected by the pattern 135 even when each of the flexible batteries 130 and 230 is embedded in the band part 110 where repeated deformation may occur while being used, degradation of performance as a battery may be prevented.

Although the above-described pattern 135 may be formed only on one side among the exterior materials 133a and 133b and the electrode assembly 134, preferably, the pattern 135 may be formed in each of the exterior materials 133a and 133b and the electrode assembly 134, and the patterns formed in the exterior materials 133a and 133b and the pattern formed in the electrode assembly 134 may be formed to coincide with each other. Further, the pattern 135 may be formed on the entire length of each of the flexible batteries 130 and 230 or may be locally formed only on a part of the length.

In addition, in the pattern 135, the mountain portions and the valley portions may be continuously or discontinuously formed, and shapes of cross-sectional surfaces of the mountain portions and the valley portions may be formed of one or more patterns selected in the group including a linear pattern, a prism pattern, a semicircular pattern, a wavy pattern, a polygonal pattern, and a mixed pattern of the above patterns.

Meanwhile, the flexible batteries 130 and 230 embedded in the band part 110 may be charged in the wired manner through the charging port 113 in a case in which the charging port 123 is provided in the headset part 120b, but may be recharged in the wireless charging manner.

To this end, the wireless headphone 200 having a built-in flexible battery according to one embodiment of the present invention may include at least one wireless power receiving antenna 140 configured to receive wireless power.

The above-described wireless power receiving antenna 140 may be disposed at the band part 110 (see FIG. 9), and may be disposed at the headset part 120b (not shown).

In the present invention, the wireless power receiving antenna 140 may receive wireless power signals transmitted in a predetermined frequency band from an external charging device to generate power for recharging the flexible batteries 130 and 230, and the wireless power receiving antenna 140 may use a magnetic induction method or a magnetic resonance method.

Since the above-described wireless power transmission method is a known configuration, detailed descriptions will not be provided.

Meanwhile, in a case in which the wireless headphone 200 having a built-in flexible battery according to one embodiment of the present invention includes the wireless power receiving antenna 140, a shielding sheet (not shown) may be disposed on one surface of the wireless power receiving antenna 140.

The shielding sheet may shield a magnetic field generated from the wireless power receiving antenna 140 and collect the magnetic field in a predetermined direction to increase wireless charging efficiency. The above-described shielding sheet may have a plate-shaped sheet shape having a predetermined area, and may be formed of various known materials having magnetism.

As an example, a ribbon sheet including at least one of an amorphous alloy and a nano-crystal alloy, a ferrite sheet, a polymer sheet, or the like may be used for the shielding sheet. Preferably, a ribbon sheet which may be thinned and may realize high permeability may be used.

Here, the ferrite sheet may be formed of Mn—Zn ferrite or Ni—Zn ferrite, and a Fe-based or Co-based magnetic alloy may be used for the amorphous alloy or the nano-crystal alloy. Further, the shielding sheet may be dividedly formed into a plurality of fine pieces through a flake process to restrict an occurrence of eddy currents, and the plurality of fine pieces may be provided to be entirely or partially insulated from the fine pieces which are adjacent to each other, and may have a shape in which a plurality of sheets are stacked in multilayers to increase permeability.

Since the above-described shielding sheet is a known configuration, detailed descriptions will not be provided, and all known shielding sheets used as the shielding sheet may be used.

Although one embodiment of the present invention is described above, the spirit of the present invention is not limited to the embodiment shown in the description, and although those skilled in the art may provide other embodiments through the addition, change, or removal of the components within the scope of the same spirit of the present invention, such embodiments are also included in the scope of the spirit of the present invention.

The invention claimed is:

1. A wireless headphone having a built-in flexible battery, comprising:
   a band part including a belt-shaped frame of which one side is open and a cover member configured to surround the frame;
   a pair of headset parts each including a speaker unit configured to receive a wirelessly transmitted audio signal and output the audio signal to the outside, the pair of headset parts being connected to the band part;
   a plate-shaped flexible battery embedded in the band part to supply power to the headset parts, and having a portion to be fastened corresponding to the fastening portion to be fixed in position when coupled to the band part;
   a fastening portion formed in the frame; and
   a portion to be fastened formed in the flexible battery to correspond to the fastening portion,
   wherein the frame is formed of a material having elasticity,
   wherein the flexible battery is fixed to at least one surface of an upper surface and a lower surface of the frame,
   wherein the flexible battery includes a pattern for contraction and relaxation when bending,
   wherein the pattern includes mountain portions and valley portions which are repeatedly arranged along a longitudinal direction of the flexible battery,
   wherein the flexible battery has the same behavior as the frame while maintaining initial positions fixed to at least one surface of the frame so that the flexible battery can be contracted and relaxed in an intended direction by the pattern when bending the frame.

2. The wireless headphone of claim 1, wherein:
   the flexible battery includes at least one blade portion configured to extend to the outside from a side edge or at least one of front and rear edges; and
   the portion to be fastened is formed in the blade portion.

3. The wireless headphone of claim 2, wherein:
   the fastening portion is formed as a first through hole passing through the frame; the portion to be fastened is formed as a second through hole passing through the blade portion at a position corresponding to that of the first through hole; and
   the frame and the flexible battery are fixed to each other through a fixing member simultaneously passing through the first through hole and the second through hole.

4. The wireless headphone of claim 3, wherein the fixing member is any one of a pin member, a bolt member, and a clip member.

5. The wireless headphone of claim 2, wherein:
   the fastening portion is formed as an incised piece which a portion of the frame is incised;
   the portion to be fastened is formed as a through hole passing through the blade portion; and
   the incised piece is inserted into the through hole.

6. The wireless headphone of claim 1, wherein a circuit part including a communication part configured to transmit and receive the audio signal through wireless communication with an external device is embedded in any one of the pair of headset parts.

7. The wireless headphone of claim 1, wherein any one of the band part and the headset parts includes a wireless power receiving antenna configured to receive a wireless power signal to wirelessly charge power of the flexible battery.

8. The wireless headphone of claim 7, wherein a shielding sheet configured to shield a magnetic field is disposed at one side of the wireless power receiving antenna.

9. The wireless headphone of claim 1, wherein the flexible battery includes an electrode assembly including a positive electrode, a negative electrode, and a separator, and an exterior material in which the electrode assembly is encapsulated together an electrolyte; and
   the exterior material and the electrode assembly are each provided with a pattern for contraction and relaxation when bending,
   the pattern formed in the exterior material and the pattern formed in the exterior material the electrode assembly are formed to coincide with each other.

* * * * *